Sept. 2, 1947.  F. A. LANG  2,426,775
PROCESS OF CURING SHEETED PLASTIC MATERIAL
Filed Sept. 5, 1945
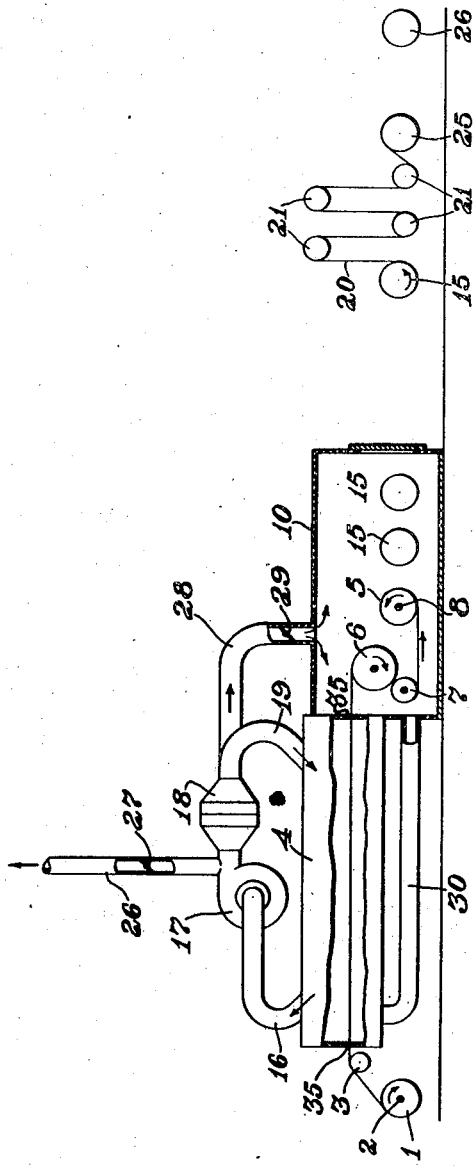
Frederic A. Lang INVENTOR.
BY
Walter C. Wheeler
ATTORNEY Patented Sept. 2, 1947

2,426,775

UNITED STATES PATENT OFFICE 2,426,775

PROCESS OF CURING SHEETED PLASTIC MATERIAL

Frederic A. Lang, Newburgh, N. Y., assignor to E. I. du Pont de Nemours & Company, Wilmington, Del., a corporation of Delaware Application September 5, 1945, Serial No. 614,519

4 Claims. (Cl. 18—48)

This invention relates to the treating of sheeted materials of plastic substances of the kind which cure in a period of time upon being heated to a reaction temperature, such as various heat curing plastics, synthetic and natural rubber compositions.

Heretofore, it has been the usual practice to dispose such sheeted material for a reaction period in a chamber and expose it to a gaseous atmosphere which is heated to the reaction or curing temperature. Often the material is festooned in such a chamber in order to increase the capacity of a chamber occupying a given sized floor space. Such chambers may be operated as batch processes by festooning the cold material, then heating the chamber to the necessary temperature for a given time to permit curing and finally cooling; or else they may be operated as continuous processes in which the material is continuously festooned in the heated chamber, held there for the necessary time for curing and then cooled. However, the use of all such equipment for such processing is disadvantageous in that large and costly equipment is required which because of its size requires the occupancy of valuable floor space. The large equipment requires a relatively large operating force per unit of product and the equipment requires a considerable outlay for maintenance. The production rate is undesirably low in such equipment. For these and other reasons it is desirable to provide improved processes and equipment.

It is among the objects of the present invention to provide for lower production costs for treating heat curing sheeted materials. Another object of the invention is to provide processes of the kind in which the use of massive equipment for a given production will be eliminated. Still another object of the invention is to eliminate the need for festooning the film or sheeted material in a heated atmosphere during the curing thereof. A further object of the invention is to provide processes wherein heat economies will be effected as compared to the heat requirements of the processes heretofore used. Still other objects of the invention will be apparent from the following description.

The objects of the invention are accomplished in general by relatively rapidly heating the sheeted material to be treated in a high temperature heating chamber to a predetermined temperature within a curing temperature range, then compacting the material as by forming a roll, then storing the material without materially raising or lowering the temperature until a predetermined curing reaction is completed, and finally cooling the material to stop the curing.

The invention will be described and illustrated in connection with the drawing constituting a part hereof, in which the sole figure thereof is a schematic representation of one form of apparatus suitable for carrying out the process of the invention.

Referring to the drawing, sheeted material such as two sheets of fabric combined with an inter-layer of uncured rubber composition which is capable of curing by heating, say to 270° F. for about one and one-half hours, is prepared and is preferably rolled upon a roll 1 which is adapted to turn on a rod 2. The combined sheet or web is drawn from the roll 1 over the guide roll 3 and through a heated chamber 4 and re-rolled into the roll 5. The sheet is propelled through the heating chamber by a device comprising the motor driven drum 6 and pressure roll 7 and is re-rolled onto a driven mandrel 8 which is connected to a source of power not shown. The drum 6 and driven mandrel 8 are desirably mounted in a second or curing chamber 10 wherein the re-rolled and heated sheet is retained for the predetermined curing time and at the curing temperature. For attaining continuous operation the rolls 15 of heated sheet are taken off the mandrel and retained in the heated chamber 10 for the rest of the curing period thus permitting the making of a new roll of heated sheet.

The heated rolls 15 are retained in the chamber 10 for a predetermined time or period in order to complete the curing. When cured, the material is cooled in any desired manner to a temperature below the curing temperature range. This is preferably done by cooling and re-winding in the atmosphere at ordinary room temperatures, such as those ordinarily prevailing in manufacturing plants, say about 65° F. to 80° F., but considerable variation in this operation is permissible whereby rapid cooling rates may be attained. For example, sheet 20 may be drawn over cooled drums 21 during the final reeling operation for lowering the temperature of the material. Although the re-winding operation disposes at the center of the roll the material which last passed through the heater 4 and which was held at the temperature of the wound roll 15 the shortest time, the difference in curing is immaterial since the curing is relatively slow as compared to the winding speeds.

The heating chamber 4 is closed except for suitable slits such as slits 35 at either end for threading the sheet of material through the opposite walls thereof and for gas circulating pipes. The chamber 4 is heated by passing in preheated air which is heated to a temperature somewhat higher than the predetermined curing temperature to which the material is to be heated. The sheeted material is drawn through the chamber at a rate which will heat the sheeted material to the desired curing temperature when it leaves the chamber. The object of the heating chamber 4 is to bring the temperature of the sheet to reaction temperature rapidly, and then discharge it in order to avoid superheating the sheet. For example, a plastic composition which is to be cured at 270° F. is heated by air which may be supplied to the chamber at 330° F. through the conduit 19. The air is recirculated through the off-take conduit 16, blower 17, and heater 18.

An exhaust duct 26 connected between the fan and the heater which is suitably fitted with a shut-off device or damper 27 is provided for exhausting a part of the air from the system. The elimination of such air from the system is desirable as a safety measure for eliminating undesired vapors which may form explosive mixtures and which are sometimes derived from the coating compositions, cements or plastic materials used in coatings for fabrics.

The re-winding of the heated web is done in the chamber 10 adjoining the heating chamber 4. A branch pipe 28 connected to the conduit 19 conducts sufficient heated air into chamber 10 to maintain this chamber at or near the curing temperature so that loss of heat from the compacted material will be non-existent or maintained at a level which does not materially affect the rate of curing of the material. Depending upon the nature of the material which is cured, it will be understood that the temperature of the curing chamber 10 and the amount of heat supplied or by-passed through this chamber may be varied within the limits which will produce a temperature within the tolerable limits of temperature variation permitted for curing. As a consequence thereof the conduit 28 is desirably provided with a damper 29 which is capable of being operated from a point externally of the conduit. The by-passed air is returned to the fan 17 through the conduit 30 which extends from chamber 10 to the low pressure end of chamber 4 and makeup air is supplied from the atmosphere through the slit 35 or it may be supplied through any opening leading to the low pressure end of the heating chamber 4.

The final reeling of the sheet may be done as illustrated in the drawing according to which the roll 15 of heated sheet material which had been retained in heating chamber 10 for the required time had been removed and mounted in a reeling device. The web is passed over the idle rolls 21 onto a driven mandrel and wound in the direction of the arrow. By proper regulation of speed and spacing of the rolls 21 the temperature of the web may be reduced below curing temperature. Alternatively the web may be rapidly cooled by providing cooled rolls 21.

In a typical cycle for curing, a length of fabric 667 yards long combined with an uncured vulcanizable rubber cement was passed through the heating chamber 4 at 40 yards per minute and heated to 270° F. Air at 330° F. was supplied to the heating chamber. The web was re-wound into a roll in chamber 10 and enough heated air was passed into this curing chamber to maintain a temperature of 270° F. The roll was held in the curing chamber an hour and a half and then finally reeled and cooled. The resulting roll 25 of material had a temperature of 120° F. At this temperature the progress of curing of the rubber composition was essentially stopped. Roll 26 represents a roll of cured fabric previously treated and cured. In similar operations it has been found that considerably more coated fabric can be processed and produced in the roll in a given time than can be produced in the form of a roll from a machine in which the sheeted material is festooned for heating and curing. The apparatus used for carrying out the process of the invention is considerably smaller than that used in carrying out processes involving festooning of the sheet material for curing, and the heat losses, operating labor and maintenance are considerably less.

*Example 1*

Two sheets of fabric 500 yards long and 39 inches wide were prepared in the well known manner by coating them with an uncured vulcanizable cement composition and evaporating the solvent of the cement coating until a tacky film was formed. The two sheets were then pressed together with the rubber composition constituting the inter-layer and bond. One fabric sheet was four yards per pound at 39 inch width and contained 80 threads per inch in both warp and filler direction. It carried a coating of cement equivalent to about 2.2 ounces per square yard of non-volatile components. The other fabric sheet was 5.5 yards per pound at 39 inch width and contained 64 x 56 threads per inch in warp and filler, respectively. This sheet carried a coating of cement equivalent to about 2.3 ounces of non-volatile components per square yard. The cement was a naphtha-synthetic rubber compound containing 54 parts of petroleum naphtha to 46 parts of the compounded rubber, the latter being compounded in the usual way of 100 parts of grade D butyl rubber, 15 parts zinc stearate, 82 parts clay, 0.75 part selenium diethyl dithiocarbamate, 0.5 part mercapto benzo thiazole, 0.75 part tetramethyl thiuram disulfide and 1.5 part sulfur.

The 500 yard long combined sheet of fabric and uncured rubber composition film was unrolled and passed endwise into a chamber and exposed therein to air heated to 310° F. to 330° F. as indicated in the drawing. The sheet was passed through the chamber at the rate of 30 yards per minute and it became heated to 270° F. All of the film of compounded rubber between the fabric sheets was thus heated to curing temperature and at this temperature the combined sheet was made into a roll as it passed from the heating chamber. The roll of material was then held for 2 hours at 270° F. by storing the roll in a chamber containing atmosphere heated to 270° F. Then the roll was removed and mounted on a reeler in the open air. The sheet was unrolled and passed through the air over idling rollers until it had cooled to a temperature below the curing range, say 180° F., and then it was reeled into a second roll.

*Example 2*

In the manufacture of a self-supporting film of plastic material, a compounded rubber was made in the known way by the use of a rubber mill and a Banbury mixer using 100 parts of type GN neoprene, 6⅔ parts magnesium oxide, 90 parts semi-reinforced carbon black, 23 parts whiting, 2 parts petrolatum, 0.4 part stearic acid, 1.8 part phenyl-beta-naphthylamine, 3⅓ parts light mineral oil, and 5 parts zinc oxide.

The compound was prepared for calendering using roller mills for warm-up and was then fed to the calender which rolled it out onto a "Holland" cloth support which was fed to the rolls. The thickness of the compounded neoprene sheet was three thirty-seconds of an inch as it left the calender. The sheeted material on the "Holland" cloth was then passed through a talcing machine.

A 100 yard roll of this material 42 inches wide was passed endwise through the heating chamber with the sheeted vulcanizable compound supported on the "Holland" cloth. The atmosphere of the chamber was heated to 290°–320° F. and the sheet was passed through at the rate of 15 yards per minute. In the heater the film was heated to 265° F. The combined sheet was immediately wound into a roll under tension upon passing out of the heating chamber. The roll was held 3 hours in a curing chamber at 265° F. after which it was removed to the atmosphere, reeled and cooled below the curing temperature range. After having been cooled the "Holland" cloth was stripped from the sheet of cured neoprene compound leaving the synthetic rubber material as an unsupported sheet.

The following data sets forth other illustrations of the invention. The data was taken from other embodiments of the invention having the characteristics and advantages of that just described and the procedures were similar except insofar as variations are specified or indicated by the data. The plastic materials cured in these examples had a curing range which extended considerably below the curing temperature shown, say about 100° F. below.

ically a heat curing material reacts continuously but extremely slowly even at ordinary atmospheric temperatures. Such a curing however is not recognized as being within a processing curing temperature range. The curing temperature range specified in connection with the present invention is that employed in processing sheeted materials of the kind specified in commercial operations.

Among the advantages of the present invention it may be mentioned that the heat curing material is subjected to the maximum atmospheric temperature while in sheet form only a relatively short time and thereafter it is stored in a compacted roll form during a relatively large proportion or all of the curing period. This feature is of advantage when treating material which may become oxidized or impaired by direct exposure to the atmosphere. Further the process requires the use of relatively small sized equipment which can be constructed economically and assembled in a relatively small space. Heat losses are relatively small because of the small sized equipment per unit of output.

Instead of heating the sheet by passing it through heated air, other heating means may be used for this purpose, such as passing the sheet between or in contact with heated grids or heating by means of infra red lamps. The sheet may be passed through the heating zone on a support such as a strip of fabric, "Holland" cloth or metal and such a strip can be wound into the roll between the plies of the sheet. Many other variations of the kind may be made. The speed of travel of the sheet through the heating zone and the temperature level therein will vary in accordance with the nature of the material, the manner of heating, and the method of heating, but the material to be cured is always exposed

| Nature of Sheeted Material | Temp. of Atmosphere in Heater | Temp. of Sheet Leaving Heater | Rate of Travel of Sheet, Yards per Minute | Curing Time, Hours at Maximum Curing Temp. | Condition of Sheeted Material When Reeled |
|---|---|---|---|---|---|
| | ° F. | ° F. | | | |
| Heat curing coating comprising polyvinyl butyral resin on one side of fabric. Coated fabric wound with interlayer of "Holland" cloth. | 300 to 330 | 260 | 25 | 1½ | Cooled to 120° F. |
| Vulcanizable coating of cement containing synthetic rubber. Coated fabric wound with inter-layer of "Holland" cloth. | 290 to 310 | 285 | 20 | 1¼ | Do. |

The essential of the heating chamber 4 in operation is to rapidly heat the sheeted material to be heat cured to a predetermined temperature within the curing range, that is to say a temperature which, if maintained, would produce curing of the material in about ½ to 3½ hours. It is of course recognized that theoretically a heat curing material reacts continuously but extremely slowly even at ordinary atmospheric temperatures. Such a curing however is not recognized as being within a processing curing temperature range. The curing temperature range specified in connection with the present invention is that employed in processing sheeted materials of the kind specified in commercial operations.

The essential of the heating chamber 4 in operation is to rapidly heat the sheeted material to be heat cured to a predetermined temperature within the curing range, that is to say a temperature which, if maintained would produce curing of the material in about ½ to 3½ hours. It is of course recognized that theoretto a temperature higher than the desired curing temperature in this zone and it may not remain in the heating zone long enough to be heated materially above that predetermined temperature.

Upon passing into the curing chamber or zone it is only necessary to maintain the temperature of the curing film within the limits of the curing temperature. Various modifications of the curing chamber may be employed for this purpose. For example, adequate insulation on the walls of the chamber will diminish the amount of heat needed to maintain the temperature within the necessary range or the addition of heat in order to maintain the temperature may be dispensed with when the insulation is adequate.

The process of the present invention is useful for curing sheeted or filamentous material in the form of a continuous sheet which is supported on a base such as fabric or is unsupported. More or less small pieces of sheeted material disposed on a sheeted support may also be treated. The invention is useful for the treatment of any kind of heat curing plastic material such as the heat curing compositions of the various kinds of synthetic rubberlike materials, such compositions containing natural rubber, acrylonitrile - butadiene, acrylonitrile-styrene, phenol- and urea-formaldehyde type resins and their modifications, alkyd resin types and heat-curable ethylenic polymers. A great variety of fabrics combined with such materials may be used.

From the foregoing disclosure it will be recognized that the invention is susceptible of modification without departing from the spirit and scope thereof, and it is to be understood that the invention is not restricted to the specific embodiments thereof which are herein set forth.

I claim:

1. The process of curing sheeted heat-curable plastic material which comprises passing the sheeted material through a heating chamber in proximity to a heating means which is heated to a temperature higher than a predetermined curing temperature of the material; heating said material in said heating chamber to a predetermined curing temperature within a curing temperature range; removing the material from said heating chamber as soon as the material has reached said predetermined curing temperature and prior to any substantial curing thereof; said curing temperature range being that which if maintained would produce curing of the material in about ½ to 3½ hours; gathering the heated sheeted material without cooling into a compact form in a curing chamber, said compact form comprising a plurality of superimposed layers of said sheeted material having a separator between the layers; retaining the material in said curing chamber in said compacted form within said curing temperature range until the material is substantially cured; and then cooling the material below the curing temperature range.

2. The process of curing sheeted heat-curable plastic material which comprises passing the sheeted material through a heating chamber in proximity to a heating means which is heated to a temperature higher than a predetermined curing temperature of the material; heating said material in said heating chamber to a predetermined curing temperature within a curing temperature range; removing the material from said heating chamber as soon as the material has reached said predetermined curing temperature and prior to any substantial curing thereof; said curing temperature range being that which if maintained would produce curing of the material in about ½ to 3½ hours; gathering the heated sheeted material without cooling into a roll in a curing chamber, said roll comprising a separator between the layers of said material; retaining the material in said roll in said curing chamber within said curing temperature range until the material is substantially cured; and then cooling the material below the curing temperature range.

3. The process of curing sheeted heat-curable plastic material which comprises passing the sheeted material through a heating chamber in proximity to a heating means which is heated to a temperature higher than a predetermined curing temperature of the material; heating said material in said heating chamber to a predetermined curing temperature within a curing temperature range; removing the material from said heating chamber as soon as the material has reached said predetermined curing temperature and prior to any substantial curing thereof; said curing temperature range being that which if maintained would produce curing of the material in about ½ to 3½ hours; gathering the heated sheeted material without cooling into a roll in a curing chamber, said roll comprising a separator between the layers of said material; retaining the material in said roll in said curing chamber within said curing temperature range until the material is substantially cured; removing the roll from said curing chamber; and then cooling the material below the curing temperature range.

4. The process of curing sheeted heat-curable plastic material which comprises passing the sheeted material through a heating chamber in proximity to a heating means which is heated to a temperature higher than a predetermined curing temperature of the material; heating said material in said heating chamber to a predetermined curing temperature within a curing temperature range; removing the material from said heating chamber as soon as the material has reached said predetermined curing temperature and prior to any substantial curing thereof; said curing temperature range being that which if maintained would produce curing of the material in about ½ to 3½ hours; gathering the heated sheeted material without cooling into a roll in a curing chamber, said roll comprising a separator between its layers of said material; retaining the material in said roll in said curing chamber within said curing temperature range until the material is substantially cured; removing the roll from said curing chamber; and then re-rolling it whilst cooling the material below the curing temperature range.

FREDERIC A. LANG.

REFERENCES CITED

The following references are of record in the file of this patent:

UNITED STATES PATENTS

| Number | Name | Date |
|---|---|---|
| 1,358,394 | Redman | Nov. 9, 1920 |
| 1,656,870 | Roth | Jan. 17, 1928 |
| 1,988,604 | Merrill et al. | Jan. 22, 1935 |
| 2,083,423 | Bennett | June 8, 1937 |
| 2,144,548 | Safford | Jan. 17, 1939 |